(12) United States Patent
Vihervuori

(10) Patent No.: US 11,212,191 B2
(45) Date of Patent: Dec. 28, 2021

(54) GUI ASSISTED INFRASTRUCTURE AS CODE

(71) Applicant: Forcepoint LLC, Austin, TX (US)

(72) Inventor: Lauri Matti Vihervuori, Espoo (FI)

(73) Assignee: FORCEPOINT LLC, Austin, TX (US)

(*) Notice: Subject to any disclaimer, the term of this patent is extended or adjusted under 35 U.S.C. 154(b) by 0 days.

(21) Appl. No.: 16/736,292

(22) Filed: Jan. 7, 2020

(65) Prior Publication Data
US 2021/0211362 A1 Jul. 8, 2021

(51) Int. Cl.
| | |
|---|---|
| H04L 12/24 | (2006.01) |
| G06F 40/186 | (2020.01) |
| H04L 29/06 | (2006.01) |
| G06F 16/28 | (2019.01) |
| G06F 9/445 | (2018.01) |
| G06F 8/61 | (2018.01) |

(52) U.S. Cl.
CPC ............ *H04L 41/22* (2013.01); *G06F 8/61* (2013.01); *G06F 9/44505* (2013.01); *G06F 16/285* (2019.01); *G06F 40/186* (2020.01); *H04L 41/0803* (2013.01); *H04L 41/24* (2013.01); *H04L 63/20* (2013.01)

(58) Field of Classification Search
CPC .. H04L 41/22; H04L 41/0803; G06F 9/44505
See application file for complete search history.

(56) References Cited

U.S. PATENT DOCUMENTS

| | | | |
|---|---|---|---|
| 7,490,319 B2 | 2/2009 | Blackwell et al. | |
| 7,984,060 B2 | 7/2011 | Payton et al. | |
| 8,370,272 B2 | 2/2013 | Wickel et al. | |
| 8,413,165 B2 | 4/2013 | Lindemann et al. | |
| 8,463,666 B2 | 6/2013 | Dorais et al. | |
| 8,473,317 B2 | 6/2013 | Santoso et al. | |
| 8,566,185 B2 | 10/2013 | Bartelt et al. | |
| 8,577,760 B2 | 11/2013 | Rutsch et al. | |
| 9,047,578 B2 | 6/2015 | Dvorak et al. | |
| 2017/0063614 A1* | 3/2017 | Hartwig | H04L 41/0886 |
| 2019/0199597 A1* | 6/2019 | Valisammagari | H04L 41/5045 |
| 2019/0296982 A1* | 9/2019 | Clark | H04L 41/22 |

FOREIGN PATENT DOCUMENTS

WO 2011/149532 12/2011

\* cited by examiner

*Primary Examiner* — Nhat Huy T Nguyen
(74) *Attorney, Agent, or Firm* — Jackson Walker LLP; Christopher J. Rourk

(57) ABSTRACT

A system for network configuration, comprising a graphic user interface system operating on a first processor and configured to allow a user to select one or more hardware infrastructure components and one or more software infrastructure components for use with a first infrastructure. A configuration recording system operating on a second processor and configured to receive two or more objects associated with each of the one or more hardware infrastructure components and each of the one or more software infrastructure components and to store the two or more objects in a template.

20 Claims, 2 Drawing Sheets

GUI ASSISTED INFRASTRUCTURE AS CODE

TECHNICAL FIELD

The present disclosure relates generally to executable software configuration management, and more specifically to a system and method for using a GUI-assisted infrastructure as code for software configuration management.

BACKGROUND OF THE INVENTION

A data network infrastructure can be described as "code," such as where a data network infrastructure configuration is written in text files under version control so that the entire infrastructure can be instantiated and replicated based on that information alone. Writing the configuration in this way is much more difficult than editing a custom built graphical user interface (GUI) that directs the user every step of the way, but it is not possible to replicate such GUI-based processes.

SUMMARY OF THE INVENTION

A system for network configuration is disclosed that includes a graphic user interface system that allows a user to select one or more hardware infrastructure components and one or more software infrastructure components for use with a first infrastructure. A configuration recording system receives two or more objects associated with each of the selected one or more hardware infrastructure components and each of the selected one or more software infrastructure components, and which stores the two or more objects in a template, such as to allow the selected objects to be modified using the graphic user interface system for a different set of hardware infrastructure and software infrastructure.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
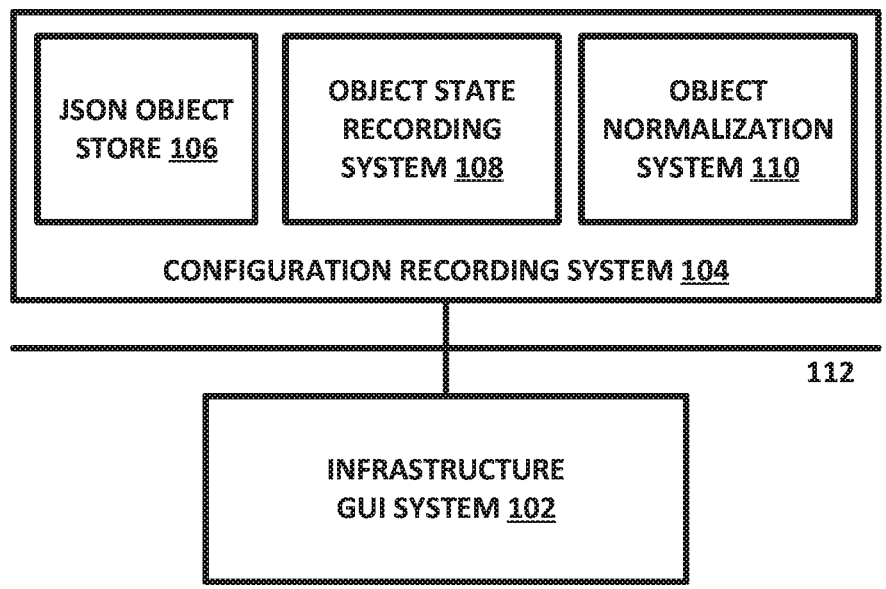
FIG. 1 is a diagram of a system for providing a GUI-assisted infrastructure as code, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Infrastructure can be described as code, such as where an infrastructure configuration is written in text files under version control, so that the entire infrastructure can be instantiated and replicated based on that text file information alone. Writing the configuration in this way is more difficult than editing a configuration template using a custom built graphical user interface (GUI) that directs the user every step of the way.

Creating the infrastructure configuration using a GUI has several advantages over writing the infrastructure configuration in text files. One advantage is that the GUI can be configured to highlight the central elements related to an infrastructure feature, such as a Microsoft SQL server, a log server, a management server, security enforcement components and other suitable elements. The GUI can be configured to guide the user to create all of the necessary elements that are required for a functioning infrastructure configuration. The GUI can also validate input while it is being provided, such as to validate device addresses and software application versions. The GUI can also validate that a referenced configuration object exists and is of the correct type, and can make it easy to find suitable existing objects to refer to. The GUI can allow a suitable object to be created if one does not exist. Writing the infrastructure configuration manually is slow because these features are missing from the workflow, which can make it more difficult for a user who is used to a GUI workflow to adopt the configuration to a new industry standard or other changes.

The present disclosure provides a mode to a management GUI that is configured to store a configuration recording of the set of configuration changes that form a reusable module of configuration, such as for a next generation firewall or other suitable systems. The GUI allows the user to indicate parametrized values with a special syntax instead of providing literal/actual values, and can generate prompts for subsequent users whenever a parametrized value is identified. Once the configuration recording is completed, the result can be exported as a set of configuration elements with the user's parameters and annotations in a format that is compatible with an infrastructure description tool, such as the Terraform open-source infrastructure as code software tool available from HashiCorp of San Francisco, Calif., or other suitable tools.

An infrastructure configuration typically stores configuration elements in JavaScript Object Notation (JSON) objects or other suitable code structures, which can facilitate the determination of the difference between the beginning and end of a configuration recording, and the GUI can modify those code structures to incorporate the identified parameter values. For example, a virtual private network (VPN) remove endpoint can be an IP address such as "10.0.0.1," and the infrastructure configuration GUI can be implemented to allow setting that value to the parameter "$remote_endpoint_ip," in addition to suitable prompt text to identify to a subsequent user what data should be input for that value. In this manner, the configuration recording module can use that parameter as a placeholder for a remote endpoint address that will be provided by a user.

The present disclosure provides for separation of template data from instantiation data in a manner that is analogous to a programming language, where the template is a "function" and the instantiation is a single "call" to that function. This structure allows the templates to scale well. For example, to create 1000 VPN sites, only a single template needs to be generated, where the objects that are different between the site configurations are parameterized and the attributes that are the same between the sites can be hard coded. When the configuration for a site is generated, a simple script can be written that reads the list of sites with the associated parameters like the endpoint address from a file and instantiates the template for each entry on that list.

The present disclosure provides a method that allows a user to take advantage of a GUI workflow, real time validation and other usability features while still storing the final result in human readable and modifiable format under version control. This method makes developing configuration scripts faster for experienced users and lowers the barrier to entry for beginners.

The present disclosure also allows a user to bring one or more modules back to the GUI for editing, and to then export the modules again. This functionality can be implemented by tagging each instantiated object to tie it back to the template that was used to create it. Once the data is exported again, the resulting differences in the text files can be minimized to improve the readability of the change during review, such as by preserving the order of the objects and the attributes of those objects, by keeping any code comments intact even though they are not part of the configuration data, or in other suitable manners.

The present disclosure can be used advantageously with Terraform or other commercially available systems that are used for describing infrastructure as code, even if they do not provide a GUI. While systems with complex configuration models like Amazon Web Services (AWS) commonly provide a GUI, they do not provide functionality to export the model data using the Terraform syntax. Codeherent of Newport, U.K. provides a Terraform GUI that allows editing of existing Terraform configurations, but it does not enable the creation of a new configuration. AWS includes a CloudFormation template language which is similar to Terraform, and also provides CloudFormation Designer, which can be used to visualize system components, but these systems do not integrate with the AWS management console. The CloudFormation template language does not enable the creation of reusable templates, and instead only operates on one instance of a template, and uses macros to make it scale by allowing expansion and transformation of the template data.

In one example embodiment, the configuration can be stored in JSON objects. Each object can identified by a unique identifier or "UID" field, which can be used to identify objects in an object-orient programming regime to refer to each other. A "recording" can be implemented by taking a snapshot of the database before the start of the recording and after the completion of the recording, and by then determining which JSON objects have appeared in the database. Modifications in existing objects can be captured by recursively traversing each object and comparing the field values in the old and new version of the object, or in other suitable manners.

A resulting "JSON diff" might not be useful by itself, if the references in the objects only makes sense in the context of that specific database. To overcome this problem, the references can be "normalized."

In one example embodiment, references can point to three kinds of objects: system objects, new objects and old objects. System object references can be associated with system object identities that are not changed, and as such, do not need any translation. A reference to a new object can be denoted in a way that identifies the object. For example, a new tunnel interface object can be created, and can include a route base virtual private network (VPN) object that references that tunnel interface object. The JSON diff can denote a tunnel identity with "$vpn_site_tunnel_interface." When a configuration template is instantiated, a new unique value can be created for the variable, where all references can use the same value. In this example embodiment, the variable can be internal to the module, and the system can generate it automatically without requiring input from the user.

An example of an interface object pseudo configuration is provided below:

```
{
    "context": "ngfwCentral",
    "type": "IfTunnel",
    "element": {
        "uid": "$vpn_site_tunnel_interface",
        "zone_ref": "local/tunnel_edge_a_b_a",
        "tenant_ref":
"local/00000000_0000_4000_8000_90b8a7d93a86",
        "tunnel_interface_id": 1001,
        "static_tunnel_address_ref_array": [
            "local/ptf_Z9Hdd64RSFOdH1akmUL8KQxx"
        ],
        "route_replies_back_interface_mode": true
    }
}
VPN object:
{
    "context": "ngfwCentral",
    "type": "VpnRouteBased",
    "element": {
        "uid": "ptf_imlcBNvASaKQw9xEtT85dwxx",
        "autoremove": true,
        "tunnel_type": {
            "encryption_mode": {
                "object_type": "no_encryption",
                "local_address": {
                    "cvi":
"local/ptf_D3kbxdfiStqhi935h3VSeQxx",
                    "tunnel_interface_ref":
"$vpn_site_tunnel_interface"
                },
                "remote_address": {
                    "address": "$endpoint_ip_address",
                    "object_type": "remote_ip"
                }
            }
        }
    }
}
```

Referencing an existing object can be accomplished by mapping the reference to the corresponding object during instantiation. The same variable notation can be used as above, but the variable can become "external," meaning it is part of a module API interface and a value for it needs to be provided by the user who instantiates the module.

Changes in existing objects can be implemented using the same algorithmic process. The JSON diff logic can detect changed objects and automatically define a variable for each such object. In one example embodiment, a newly created tunnel interface can be added to list of interfaces for an existing firewall object. The JSON diff logic can generate a "modification" object or other suitable data structures that define the change. An example of a suitable pseudo configuration is shown below:

```
{
    "type": "append",
    "path": "$firewall_1/main_physical_interface_ref_array"
}
```

The variable $firewall_1 can be automatically generated and can be part of an external API. The user can rename the variable to something more descriptive and add documentation to it, where suitable. The same algorithmic process can be used to denote suitable variables in the user interface. For example, the VPN object sample above can use "$endpoint_ip_address" to denote a VPN endpoint IP address or other suitable data. The user can provide the value, such as endpoint_ip_address="123.2.65.7" for the variable, when instantiating the template or in other suitable manners.

FIG. 1 is a diagram of a system 100 for providing a GUI-assisted infrastructure as code, in accordance with an example embodiment of the present disclosure. System 100 includes infrastructure GUI system 102, configuration recording system 104, JSON object store 106, object state recording system 108, object normalization system 110 and network 112, each of which can be implemented in hardware or a suitable combination of hardware and software.

Infrastructure GUI system 102 can be implemented as one or more algorithms configured to be executed on a processor that cause GUI objects to be created, for use in generating code for a new infrastructure based on the code that has been generated for a prior infrastructure using infrastructure GUI system 102. In one example embodiment, infrastructure GUI system 102 can be implemented on a processor that is used in conjunction with configuration recording system 104 to store a template for an infrastructure, to implement a stored template for a new infrastructure or for other suitable purposes.

Configuration recording system 104 can be implemented as one or more algorithms configured to be executed on a processor for recording a template for an infrastructure as it is being created, for implementing a stored template or for other suitable processes. In one example embodiment, configuration recording system 104 can process objects associated with a user interface as it is being used to create an infrastructure, such as a firewall or other suitable infrastructures, and can store the changes that are made to allow a similar hardware configuration to be configured using a GUI configuration process, such as by using a template or in other suitable manners. Likewise, configuration recording system 104 can be used to implement the stored changes for a new hardware infrastructure or for other suitable purposes.

JSON object store 106 can be implemented as one or more algorithms configured to be executed on a processor that are used to store JSON objects or other suitable objects that are used to implement a GUI-driven configuration system that is used to configure one or more hardware components for use as infrastructure, such as a firewall infrastructure or other suitable infrastructures. In one example embodiment, the JSON objects that are associated with the infrastructure can be used to configure hardware and software components of the infrastructure to provide the infrastructure with a specific functionality that is optimized for the configuration of the hardware and associated software. JSON object store 106 can also be used to implement the stored objects in a new infrastructure, such as by providing a template structure for the JSON objects associated with a template or in other suitable manners.

Object state recording system 108 can be implemented as one or more algorithms configured to be executed on a processor to store object state data associated with an infrastructure configuration process. In one example embodiment, object state recording system 108 can retrieve existing objects associated with a graphical interface that defines a hardware and software infrastructure prior to the start of an infrastructure design process, such as when one or more hardware and/or software components are selected for an infrastructure and the associated configration objects for the hardware and software components are assembled. The objects and their associated states can then be stored, and the process can be repeated at the end of the infrastructure design process, where the state of the objects can be stored, as well as the state of any new objects, the absence of deleted objects and other suitable data.

Object normalization system 110 can be implemented as one or more algorithms configured to be executed on a processor that identifies one or more types of objects associated with an infrastructure, system objects, new objects and old objects. In this example embodiment, the system objects can be associated with system components that do not change as part of the infrastructure design, and can be omitted from the template, and the new objects and old objects can be associated with objects that are new or modified as part of the infrastructure design. Likewise, other suitable normalization classes can also or alternatively be used.

Network 112 can be implemented in hardware or a suitable combination of hardware and software, and can be used by infrastructure GUI system 102 to access configuration recording system 104 during the design process for an infrastructure, either to store an infrastructure configuration, to access and modify a stored configuration or for other suitable purposes. Network 112 can be implemented as a local area network, a wide area network, a fiber optic network, a virtual network, other suitable networks or a suitable combination of networks.

Figure 2:
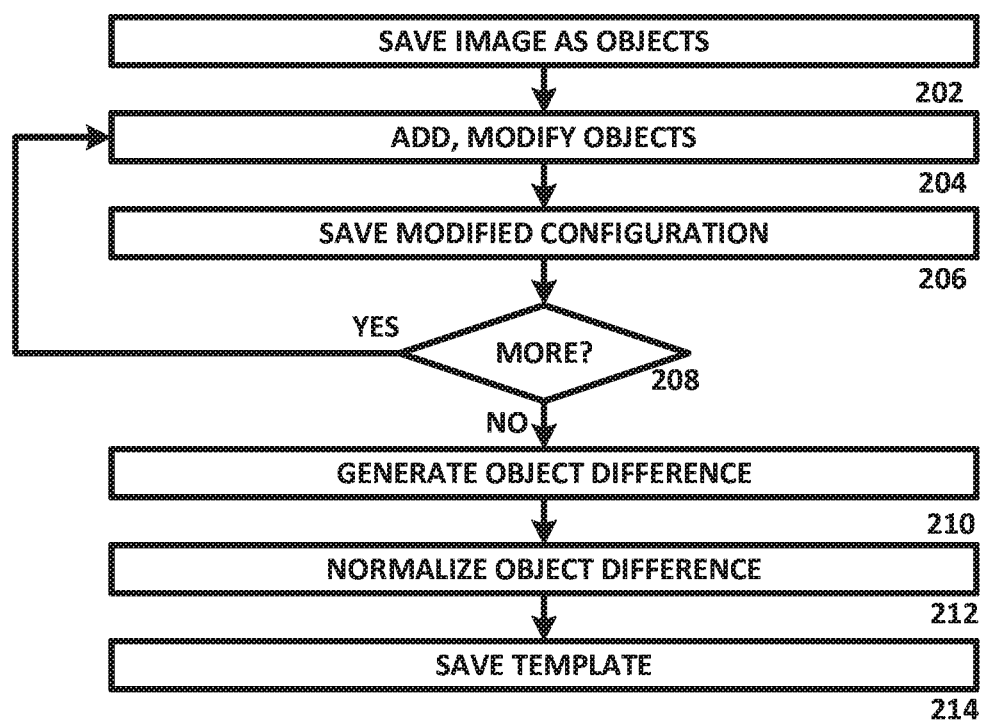
FIG. 2 is a diagram of an algorithm for providing a GUI-assisted infrastructure as code, in accordance with an example embodiment of the present disclosure.

FIG. 2 is a diagram of an algorithm 200 for storing a GUI-assisted infrastructure as code, in accordance with an example embodiment of the present disclosure. Algorithm 200 can be implemented in hardware or a suitable combination of hardware and software on one or more processing platforms.

Algorithm 200 begins at 202, where a GUI configuration is saved as one or more objects. In one example embodiment, the GUI configuration can be saved as JSON objects or other suitable objects after one or more hardware and/or software components with standard or basic JSON objects have been selected for an infrastructure or in other suitable manners. The algorithm then proceeds to 204.

At 204, objects are added or modified. In one example embodiment, the JSON objects or other suitable objects associated with the hardware and software components can be modified, new JSON objects or other suitable objects can be created or other suitable processes can also or alternatively be implemented. The algorithm then proceeds to 206.

At 206, the modified configuration is stored. In one example embodiment, the state of the objects at the point in time at which 206 is executed can be saved, such as in a template structure or in other suitable manners. The algorithm then proceeds to 208.

At 208, it is determined whether any more changes are to be made. If it is determined that more changes are to be made, the algorithm returns to 204, otherwise the algorithm proceeds to 210.

At 210, an object difference is generated. In one example embodiment, a JSON object or other suitable objects can have a large number of data fields, but may have only had a small number of changes, and the object difference can be used to identify those changes or for other suitable purposes. The algorithm then proceeds to 212.

At 212, the object difference is normalized. In one example embodiment, one or more types of objects associated with an infrastructure can be used for normalization, such as system objects, new objects and old objects. In this example embodiment, the types of objects can be used to classify the object differences, such as with system objects that can be associated with system components that do not change as part of the infrastructure design, and can be omitted from the template, and new objects and old objects that can be associated with objects that are new or modified as part of the infrastructure design, or other suitable processes can also or alternatively be used. The algorithm then proceeds to 214.

At 214, the template is saved. In one example embodiment, the template can be saved as a template for use in configuring a new infrastructure, but the template can also be stored for use with a specific infrastructure or in other suitable manners.

In operation, algorithm 200 allows a GUI-assisted infrastructure to be stored as code, which eliminates the need to store the infrastructure in text format. Although algorithm 200 is shown as a flow chart, one of ordinary skill can implement algorithm 200 using object-oriented programming, a state diagram, a ladder diagram or in other suitable manners.

Figure 3:
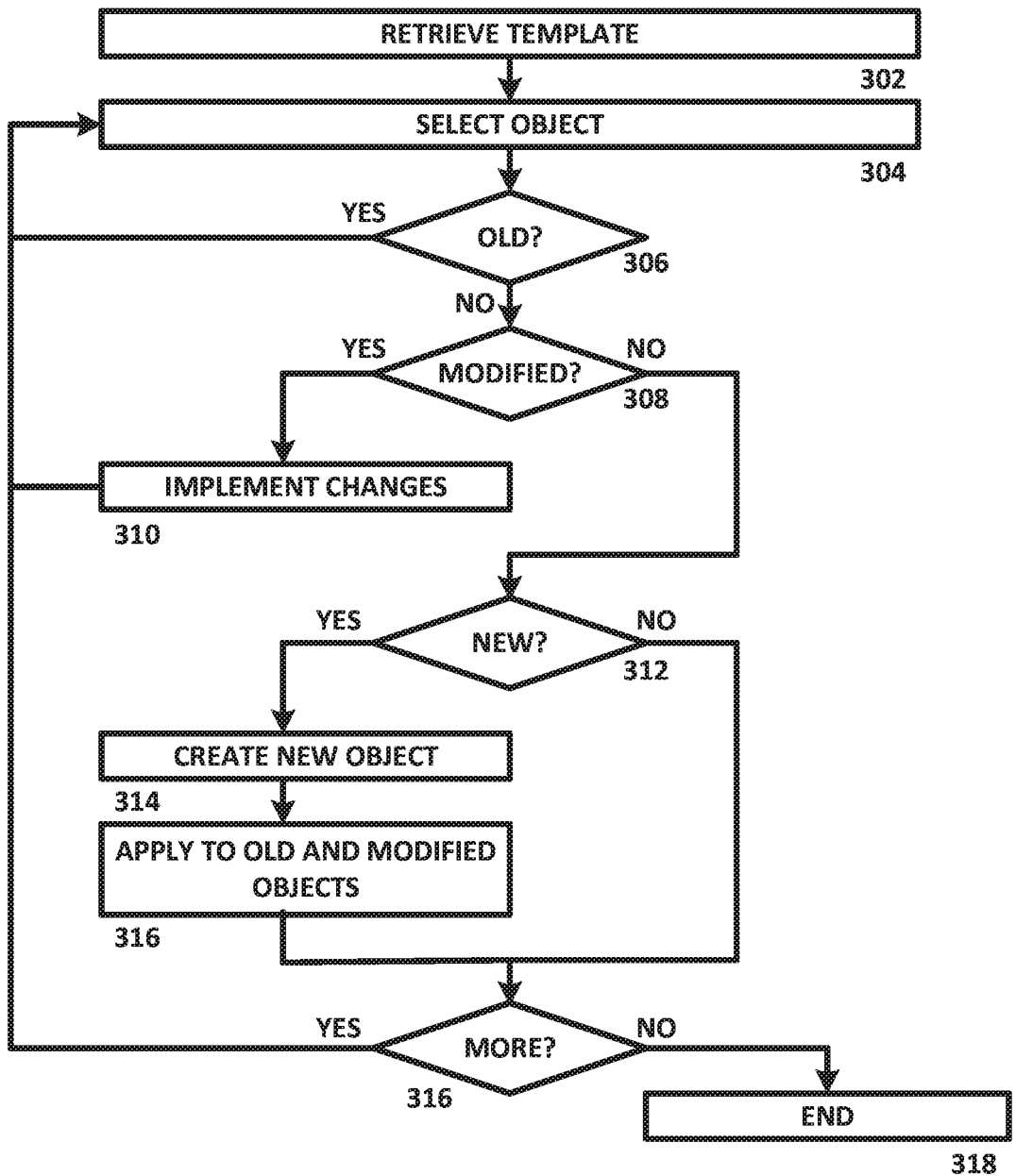
FIG. 3 is a diagram of an algorithm for using a GUI-assisted infrastructure as code, in accordance with an example embodiment of the present disclosure.

FIG. 3 is a diagram of an algorithm 300 for using a GUI-assisted infrastructure as code, in accordance with an example embodiment of the present disclosure. Algorithm 300 can be implemented in hardware or a suitable combination of hardware and software on one or more processing platforms.

Algorithm 300 begins at 302, where a template is retrieved. In one example embodiment, the template can include one or more JSON object differences or other suitable data, such as data for unconfigured hardware and software associated with a network infrastructure, data for a specific configuration of hardware and software associated with a network infrastructure such as a firewall infrastructure, or other suitable templates or data. The algorithm then proceeds to 304.

At 304, an object is selected. In one example embodiment, the selected object can be associated with JSON object difference data or other suitable data. The algorithm then proceeds to 306.

At 306, it is determined whether the object is an old and unmodified object. If it is determined that the object is not old and unmodified, the algorithm proceeds to 308, otherwise the algorithm returns to 304.

At 308, it is determined whether the object has been modified. If it is determined that the object has been modified, the algorithm proceeds to 310, otherwise the algorithm proceeds to 310.

At 310, changes to an object are implemented. In one example embodiment, the object can be modified for use in a new hardware and software infrastructure, such as for a firewall system or in other suitable manners. The algorithm then returns to 304.

At 312, it is determined whether the object is new. If it is determined that the object is new, the algorithm proceeds to 314, otherwise the algorithm proceeds to 318.

At 314, a new object is created. In one example embodiment, the object can be created for use in a new hardware and software infrastructure, such as for a firewall system or in other suitable manners. The algorithm then proceeds to 314.

At 316, the new object is applied to old and modified objects and other suitable data. In one example embodiment, a new object may result in corresponding changes to old objects, previously modified objects or other suitable data. The algorithm then proceeds to 318.

At 318, it is determined whether any more objects need to be processed. If more objects need to be processed, the algorithm returns to 304, otherwise the algorithm proceeds to 320 and terminates.

In operation, algorithm 300 allows a GUI-assisted infrastructure to be implemented as code, which eliminates the need to store the infrastructure in text format. Although algorithm 300 is shown as a flow chart, one of ordinary skill can implement algorithm 300 using object-oriented programming, a state diagram, a ladder diagram or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for network configuration, comprising:
a graphic user interface system operating on a first processor and configured to allow a user to select a plurality of hardware infrastructure components from a data memory device and a plurality of software infrastructure components from the data memory device for use with a first infrastructure using the processor; and
a configuration recording system operating on a second processor and configured to receive a plurality of objects associated with each of the selected hardware infrastructure components and each of the selected software infrastructure components and to store the plurality of objects in a single template for a second infrastructure in the data memory device using the processor;
wherein the graphic user interface system is configured to modify one or more of the plurality of objects for the plurality of hardware infrastructure components of a network that implements the second infrastructure and the plurality of objects for the plurality of software infrastructure components of the network that implements the second infrastructure and to delete hardware infrastructure components and software infrastructure components for the single template for the second infrastructure if it is determined that they do not have any associated modified objects in the network.

2. The system of claim 1 further comprising the graphic user interface system configured to retrieve the plurality of objects in the template and to create two or more new objects for use with the second infrastructure.

3. The system of claim 1 further comprising an object state recording system operating on the second processor and configured to store a state of the plurality of objects prior to configuration of the plurality of objects for use with the first infrastructure and to store a state of the plurality of objects after configuration of the plurality of objects for use with the first infrastructure.

4. The system of claim 1 further comprising an object normalization system operating on the second processor and configured to classify the plurality of objects for each hardware infrastructure component and software infrastructure component as a system object, a new object or an old object.

5. The system of claim 1 wherein the one or more hardware infrastructure components comprise a log server having associated system objects, new objects and old objects.

6. The system of claim 1 wherein the one or more software infrastructure components comprise a log server application having associated system objects, new objects and old objects for controlling a log server having associated system objects, new objects and old objects.

7. The system of claim 1 wherein the one or more hardware infrastructure components comprise a management server having associated system objects, new objects and old objects.

8. The system of claim 1 wherein the one or more software infrastructure components comprise a management server application having associated system objects, new objects and old objects for controlling a management server having associated system objects, new objects and old objects.

9. The system of claim 1 wherein the one or more hardware infrastructure components comprise a security enforcement component having associated system objects, new objects and old objects.

10. The system of claim 1 wherein the one or more software infrastructure components comprise a security enforcement component application having associated system objects, new objects and old objects for controlling a security enforcement component having associated system objects, new objects and old objects that are different from the system objects, new objects and old objects for the security enforcement component application.

11. A method for network configuration, comprising:
generating a graphic user interface using a first processor that is configured to allow a user to select one or more hardware infrastructure components from a first data memory device and one or more software infrastructure components from the first data memory device using the first processor for use with a first infrastructure;
receiving a plurality of objects associated with each of the selected one or more hardware infrastructure components from a second data memory device and each of the selected one or more software infrastructure components from the second data memory device using a second processor;
storing the plurality of objects in a template in the second data memory device using the second processor; and
installing the template in data memory devices of a second infrastructure for a different enterprise network using a third processor after deleting objects from the template for components in the enterprise network that have not changed.

12. The method of claim 11 further comprising:
retrieving the two or more objects in the template the graphic user interface system using the third processor; and
creating two or more new objects for use with the second infrastructure using the third processor, wherein the objects comprise a JavaScript Object Notation (JSON) object.

13. The method of claim 12 further comprising:
storing a state of the two or more JSON objects using the second processor prior to configuration of the two or more JSON objects for use with the first infrastructure; and
storing a state of the two or more JSON objects using the third processor after configuration of the two or more JSON objects for use with the first infrastructure.

14. The method of claim 12 further comprising classifying the two or more JSON objects as a system JSON object, a new JSON object or an old JSON object using the second processor.

15. The method of claim 11 wherein the one or more hardware infrastructure components comprise a log server and the method further comprises:
selecting a log server object that is associated with JavaScript Object Notation (JSON) object difference data;
determining whether the log server object is new; and
creating a new JSON object for a firewall system.

16. The method of claim 11 wherein the one or more software infrastructure components comprise a log server application for controlling a log server.

17. The method of claim 11 wherein the one or more hardware infrastructure components comprise a management server.

18. The method of claim 11 wherein the one or more software infrastructure components comprise a management server application for controlling a management server.

19. The method of claim 11 wherein the one or more hardware infrastructure components comprise a security enforcement component.

20. The method of claim 11 wherein the one or more software infrastructure components comprise a security enforcement component application for controlling a security enforcement component.

* * * * *